United States Patent

Heintze et al.

Patent Number: 5,308,486
Date of Patent: May 3, 1994

[54] MULTI-DECK FILTER

[75] Inventors: Burkhard Heintze, Issum; Josef Triesch, Düsseldorf, both of Fed. Rep. of Germany

[73] Assignee: Mannesmann Aktiengesellschaft, Dusseldorf, Fed. Rep. of Germany

[21] Appl. No.: 854,106

[22] Filed: Mar. 18, 1992

[30] Foreign Application Priority Data

Mar. 22, 1991 [DE] Fed. Rep. of Germany ....... 9103729

[51] Int. Cl.$^5$ .............................................. B01D 33/00
[52] U.S. Cl. ................................. 210/396; 210/407; 210/387; 210/400; 100/198
[58] Field of Search ............... 210/106, 225, 231, 387, 210/391, 396, 400, 407, 408; 100/194, 195, 196, 198

[56] References Cited

U.S. PATENT DOCUMENTS

| | | | |
|---|---|---|---|
| 636,323 | 11/1899 | Davis | 210/408 |
| 2,315,252 | 3/1943 | Fraser | 210/408 |
| 3,608,734 | 9/1971 | Schneider | 210/387 |
| 4,233,157 | 11/1980 | Miller | 210/387 |
| 4,738,775 | 4/1988 | Schneider | 210/387 |
| 4,802,928 | 2/1989 | Dunlap | 210/396 |
| 4,869,834 | 9/1989 | Hudson | 210/396 |

*Primary Examiner*—Peter A. Hruskoci
*Assistant Examiner*—Robert James Popovics
*Attorney, Agent, or Firm*—Cohen, Pontani, Lieberman, Pavane

[57] ABSTRACT

A multi-deck filter comprising a plurality of filter plates arranged horizontally one above another which are held in parallel planes by respective frames surrounding them. A filtrate chamber and a sludge chamber are formed in each case alternately between adjacent filter plates and frames. A filter belt, which is moveable stepwise by a transport device, is positioned between two pairs of filter plates. The filter belt is unwound from a supply roll positioned outside of the multi-deck filter and, after removal of the dirt filter cake, collected by the multi-deck filter wound onto a collecting roll. A scraper, which contacts the surface of the filter belt, is positioned transversely and obliquely to the filter belt between multi-deck filter and collecting roll, for scraping off the dirt filter cake from the filter belt. An abutment positioned below the filter belt is associated with the scraper.

7 Claims, 4 Drawing Sheets

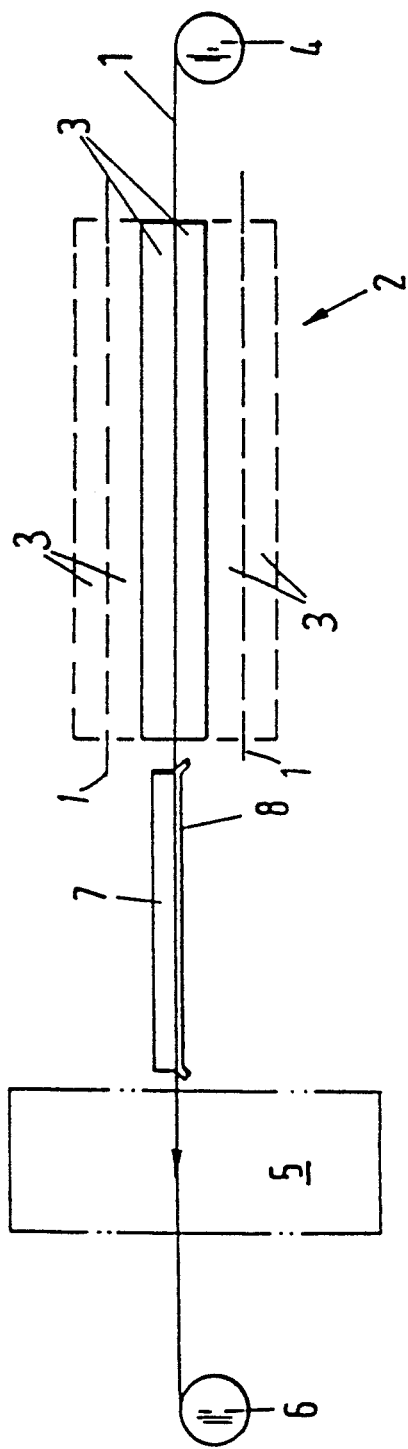
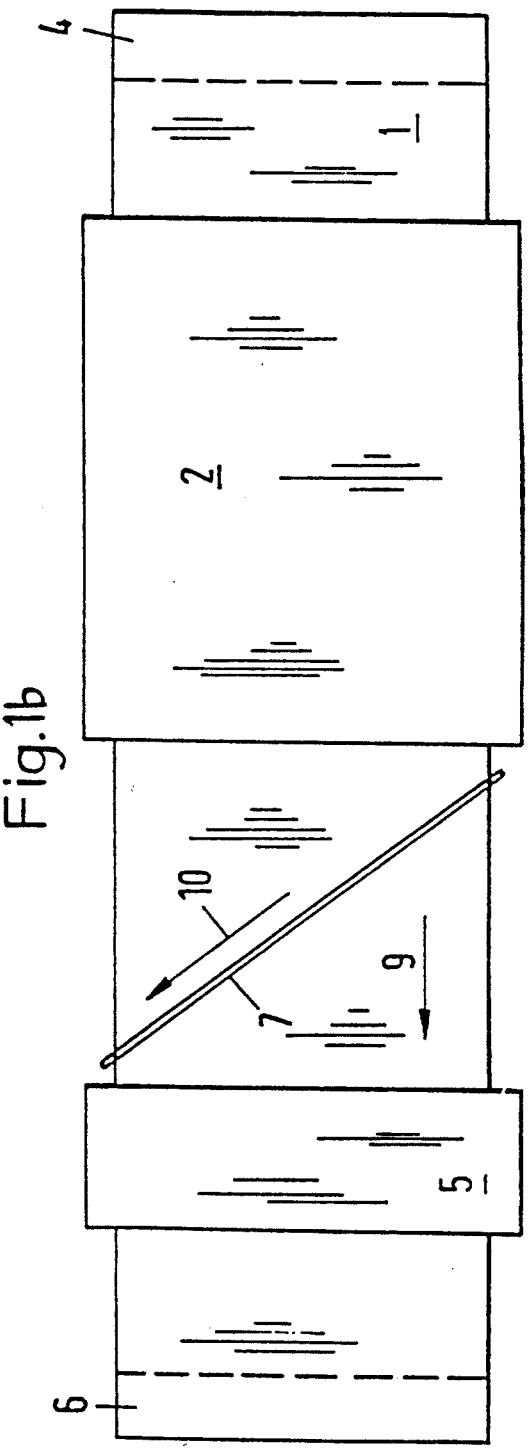

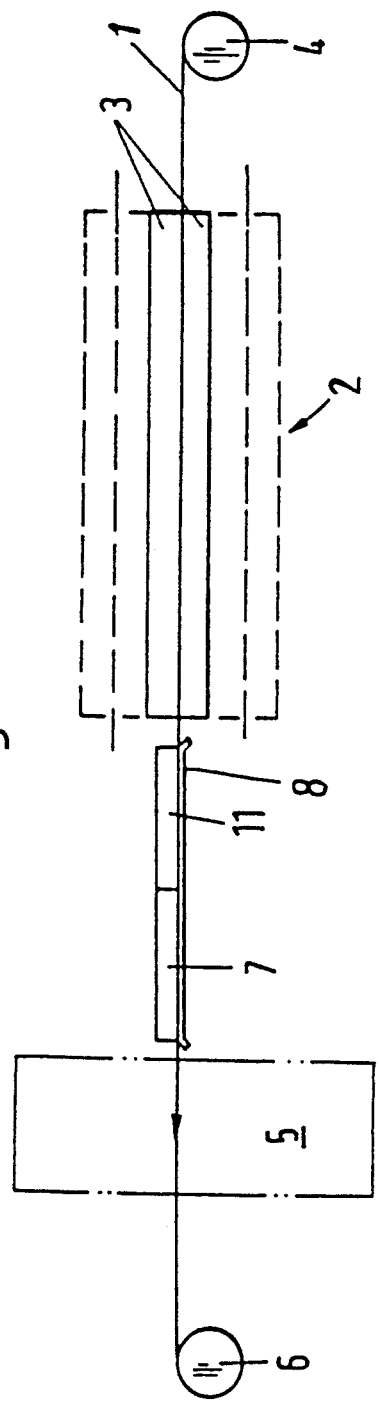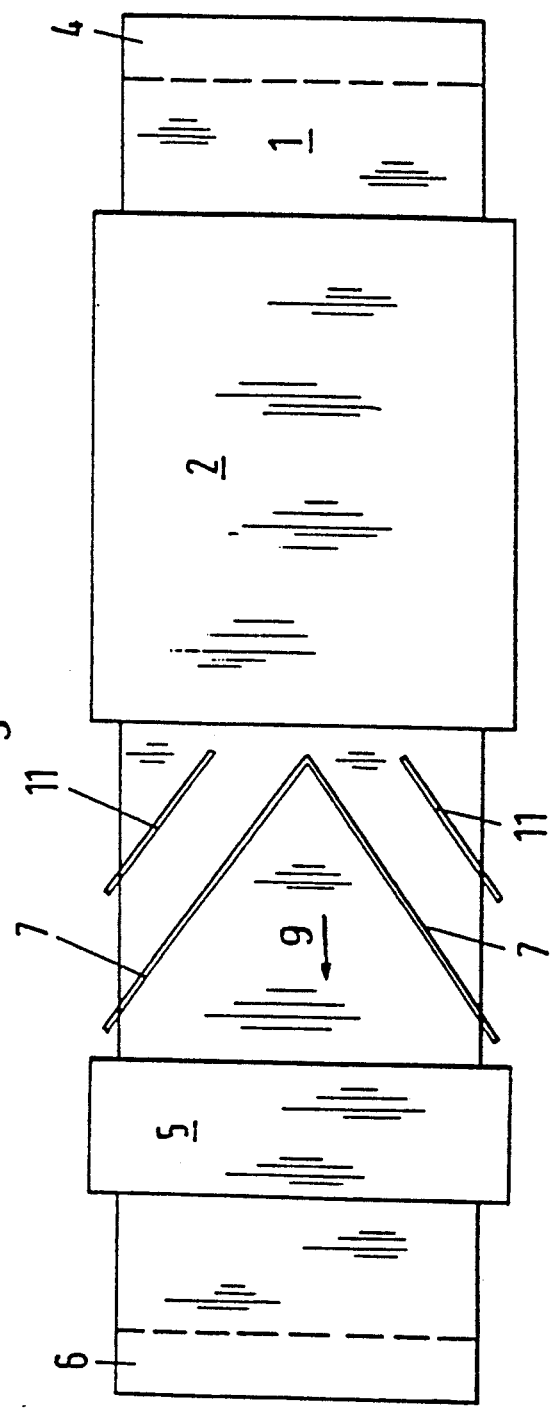

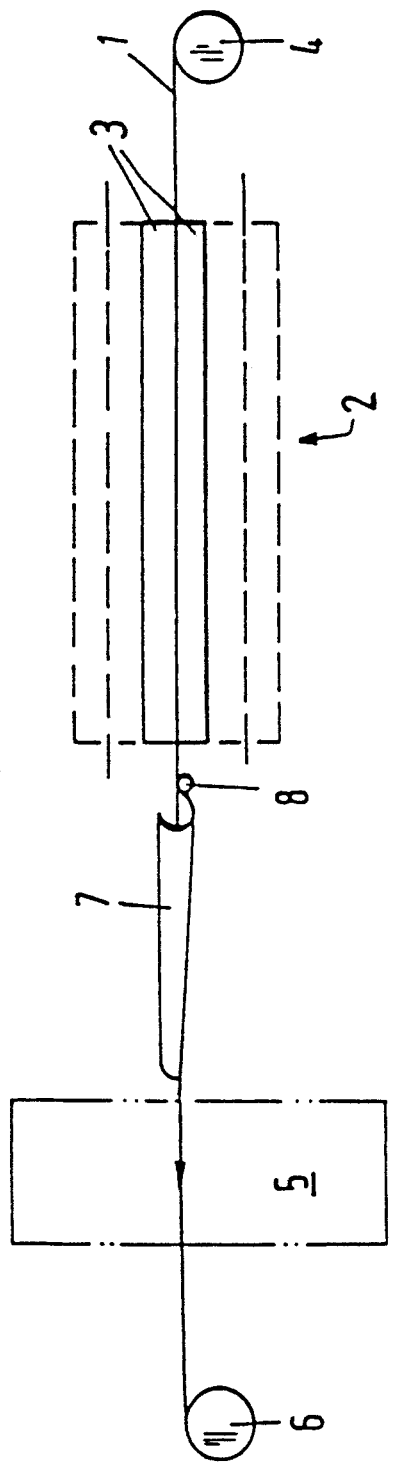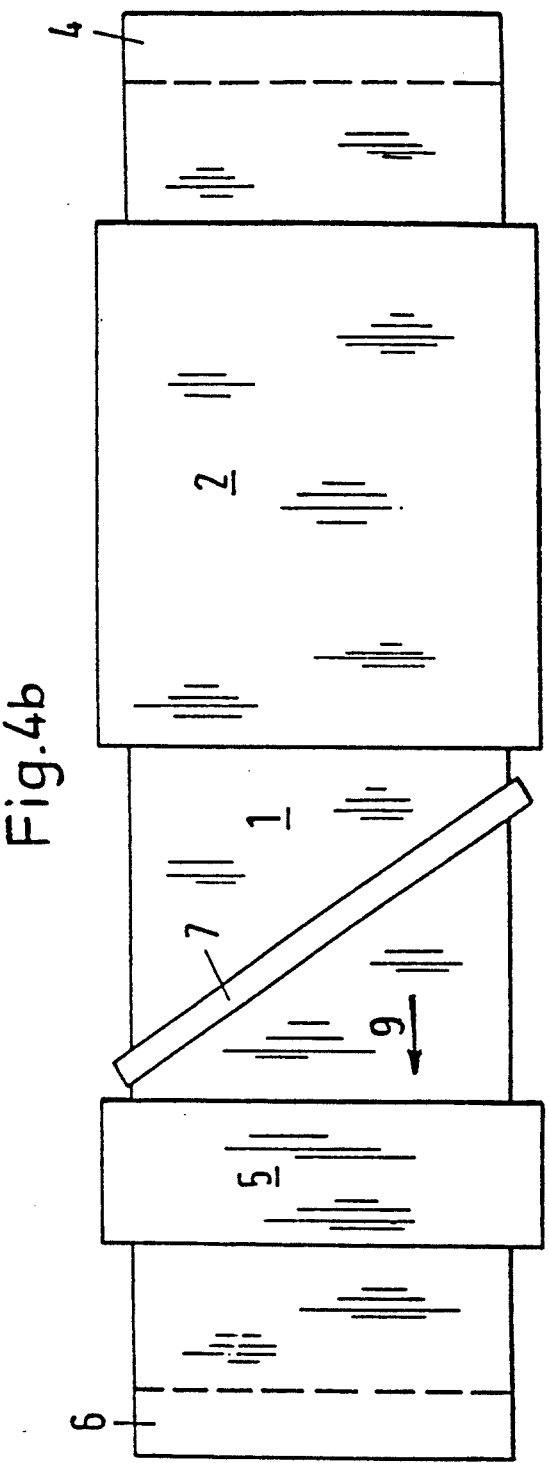

MULTI-DECK FILTER

BACKGROUND OF THE INVENTION

Multi-deck filters are pressure filters in which the filter-plate frames rest against one another and are pressed together. The filtrate that is fed to the filter plate frames is discharged through the frames and its outlet openings. The filtering process takes place with the plates pressed together, so that a filter belt is positioned between two adjacent filter plates which are clamped in place. The filtrate flows through the filter plates, while particles of dirt are collected by the filter belt. The dirt cake which is collected must be removed from the multi-deck filter from time to time. For this purpose, the filter plates, together with their frames, are unclamped and separated by a suitable device so that the dirty portion of the filter belt can be moved out from between the filter plates by means of a transport device and replaced by a clean portion of the filter belt. The filter plates and frames are then clamped together so that the multi-deck filter is again ready for filtering.

In conventional belt filters, the filter cake is removed by a deflection roll of the filter belt. The filter cake is broken up by the deflection of the filter belt and formed into pieces which then drop into a receiving means below the filter belt. In multi-deck filters where several chambers are positioned one above the other and thus several filter belts also travel one above the other, this method of removing the dirt filter cake is disadvantageous. Because the filter belt must be deflected, the subsequent winding of the filter belt from which the dirt filter cake has been removed cake onto collecting rolls is impeded due to considerations of space. Problems also arise with regard to the guiding of the belt.

European Patent No. 03 04 579 discloses a device in which the filter belt is guided around a deflection edge positioned obliquely to the direction of the belt and turning the bottom face of the belt upward. In this way, better guidance of the belt is obtained while effective detachment of the filter cake is also achieved. This device, however, is very expensive due to its large number of deflection rolls and is thus subject to disturbance, and furthermore requires extensive maintenance.

SUMMARY OF THE INVENTION

The object of the present invention is to provide an improved multi-deck filter in which the filter belt travels linearly and the dirt cake is simply and reliably scraped from the filter belt. According to the present invention, at least one scraper is positioned transversely and obliquely to the filter belt and rests on the surface of the filter belt. The scraper scrapes the filter cake off the filter belt between the multi-deck filter and the collecting roll. An abutment is positioned below the filter belt immediately below the scraper. The filter cake is scraped off from the belt by this simple scraper upon the movement of the dirty filter belt.

In a preferred embodiment, the scraper is stiff and extends over the entire width of the filter belt oblique to the direction of travel of the filter belt. As a result, when the filter belt is transported, the scraper conducts the filter cake to the side of the filter belt where the dirt is collected in an appropriate container. This design provides a very simple scraping system with low wear that requires little maintenance. The design is also economical with respect to space and cost. The abutment is a pressure plate which holds the filter belt against the scraper. The slight distance between the pressure plate and the belt scraper permits the scraper to detach the dirt filter cake like a scraping knife and remove dirt cake laterally.

In another embodiment of the present invention, the scraper has a V-shape and is positioned on the filter belt so that the arms of the scraper extend outward on both sides and so that the V points in a direction opposite to the direction of transport of the filter belt. This design advantageously allows only one part of the dirt cake to be transported to one side of the filter belt and the other portion the other side of the filter belt.

In a further embodiment of the present invention, several scrapers are provided lying substantially parallel to one another, which partially overlap one another over the width of the filter belt. As a result, the cake of dirt is divided into several portions so that quantities of dirt cake are not transported to the same position on one side of the filter belt.

In yet another embodiment of the present invention, the abutment has a rounded profile and is positioned oblique to the direction of travel of the filter belt. The associated scraper is positioned behind the abutment in the direction of transport and parallel to the abutment. The scraping edge of the scraper is present in the plane of the filter belt and squeezes the filter belt over the abutment. In this design, the dirt cake is detached in a particularly favorable manner by the squeezing process and reliably removed by the scraper.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

FIGS. 1a and 1b are side and top views, respectively, of an obliquely arranged scraper of the present invention;

FIGS. 3a and 3b are side and top views, respectively, of a plurality of cooperating scrapers of the present invention; and FIGS. 4a and 4b are side and top views, respectively, of a squeezing device with scraper of the present invention.

DESCRIPTION OF THE PRESENTLY PREFERRED EMBODIMENTS

Figure 2A:
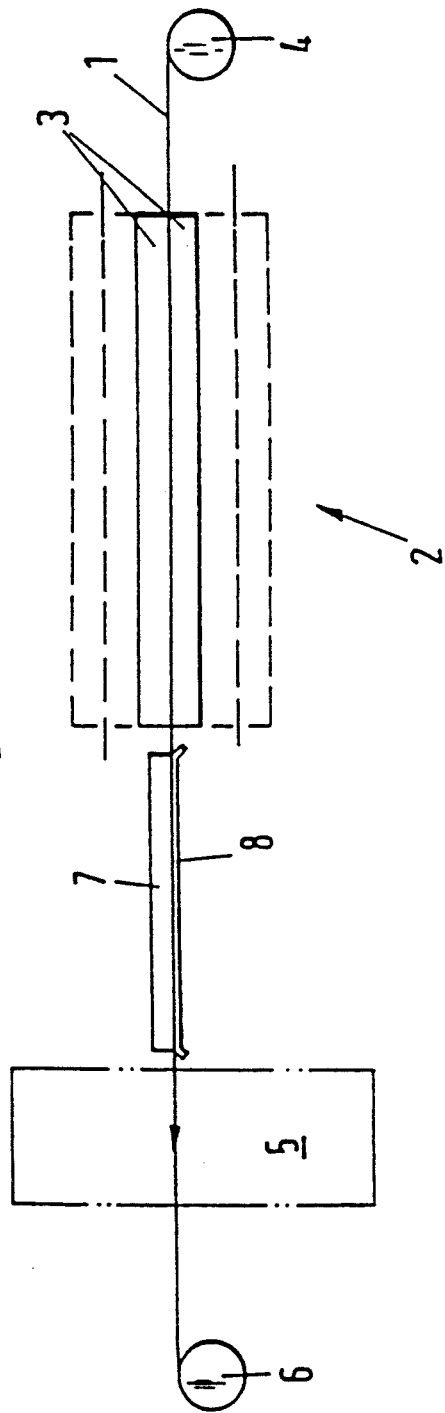
FIGS. 2a and 2b are side and top views, respectively, of a V-shaped scraper of the present invention.

Referring to FIG. 1a, filter belt 1 consists illustratively, of a non-woven fabric. Multi-deck filter 2 consists of a plurality of filter plates stacked one on top of another, with two filter plates 3 surrounding filter belt 1. Filter belt 1 is unrolled from supply roll 4 and, with the filter plates 3 moved apart, pulled by means of a transport device 5 by one step lengths out of multi-deck filter 2 so as to remove the cake of dirt which has collected on filter belt 1. After the cake of dirt has been removed, filter belt 1 is wound onto collecting roll 6 and can later be cleaned. As shown in FIG. 1b, the width of filter belt 1 is preferably substantially equal to the width of filter plates. Scraper 7 scrapes the cake of dirt from the upper surface of filter belt 1 and is comprised of a flat bar, preferably flexurally rigid, which is held transversely and obliquely (as more clearly seen of FIG. 1b) on the upper surface of the filter belt 1 by a holding means (not shown). On the bottom surface of filter belt 1, there is abutment 8 which, illustratively, consists of a pressure plate which extends over the entire bottom of filter belt 1 substantially in the region of the scraper 7.

Upon the transport of filter belt 1 in the direction of transport shown by arrow 9, the cake of dirt removed from multiple deck filter 2 is detached from filter belt 1 by scraper 7 and pushed to the side edge of filter belt 1 and then laterally off filter belt 1 in the direction indicated by arrow 10. Transport device 5, which preferably consists of squeeze rollers which clamp cleaned filter belt 1 between them and feeds filter belt 1 to winding roll 6.

Figure 2B:
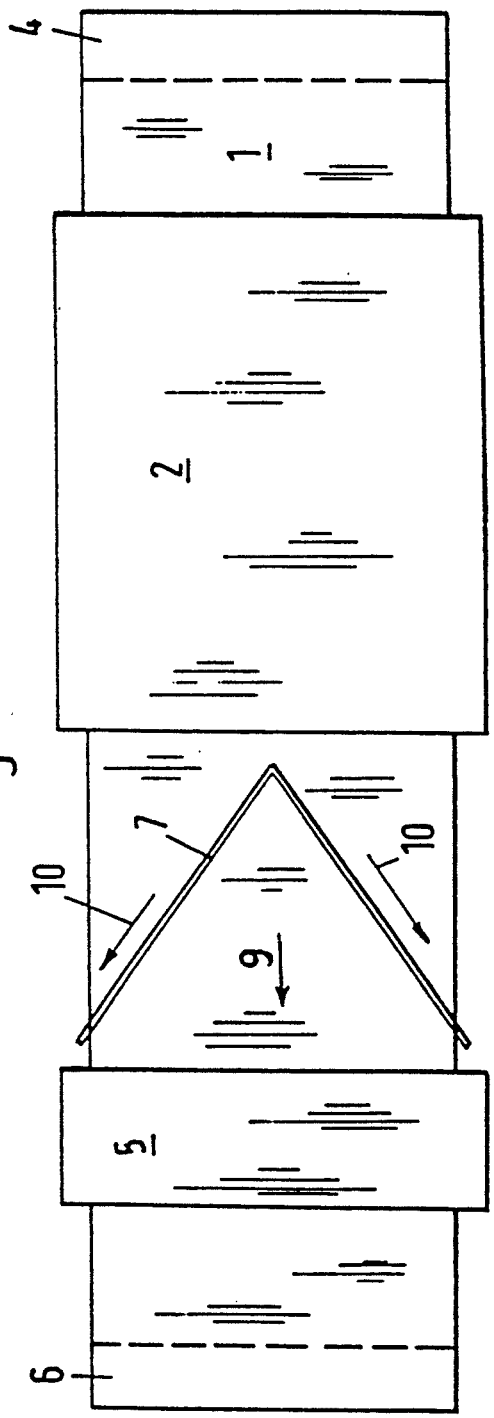

In the remaining figures, the same reference numerals are used for like elements. Referring to the embodiment shown in FIGS. 2a and 2b scraper 7 has a V-shape, the vertex being directed opposite to the direction of transport 9 of filter belt 1 and the arms extending outward to the side edges of filter belt 1. In this embodiment, the cake of dirt is divided on the filter belt into two individual portions which are ejected on the two sides of filter belt 1 in the directions indicated by arrows 10. This embodiment has the advantage that a quantity of dirt cake is transported only, at most, over half the width of filter belt 1.

FIGS. 3a and 3b show an embodiment which prevents large amounts of cake from accumulating in near the outer end of scraper 7. In this embodiment, in addition to V-shaped scraper 7, two additional scrapers 11 are positioned substantially parallel to the arms of scraper 7 and thus partially overlap V-shaped scraper 7 in the direction of travel of filter belt 1. These additional scrapers 11 remove dirt only near the edges of filter belt 1. These additional scrapers 11 remove a part of the cake of dirt from near the edge of filter belt 1 so that scraper 7 scrapes only the center region of the filter belt 1 and the cake of dirt does not accumulate near the outer end of scraper 7.

FIGS. 4a and 4b show an alternative embodiment in which abutment 8 is a preferably round bar having a round profile over which filter belt 1 is conducted. Scraper 7 presses upon or distends the upper surface of filter belt 1 so far downward that scraper 7 guides filter belt 1 over abutment 8 and thereby breaks up the cake of dirt. The cake of dirt which has been detached in this way from filter belt 1 is discharged in the same direction as in the embodiment shown in FIGS. 1a and 1b, laterally from filter belt 1 in the direction of arrow 10 by scraper 7. In this embodiment, scraper 7 has a dish shape.

Thus, while there have been shown and described and pointed out fundamental novel features of the invention as applied to a preferred embodiment thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto. For example, in the embodiment shown in FIGS. 1a and 1b, more than one scraper may be used which are positioned substantially parallel to one another. These additional scrapers are positioned like additional scrapers 11 in FIGS. 3a and 3b and remove a part of the cake of dirt near the edge of the filter belt so that scraper 7 scrapes only the center or one edge of the filter belt while the additional scrapers scrape the other edge of the filter belt.

What is claimed is:

1. A multi-deck filter, comprising:
   a plurality of filter plates (3) stacked horizontally on top of and parallel to one another, said filter plates having a width and a length;
   a horizontally arranged filter belt (1) having a width substantially equal to the width of two adjacent filter plates (3), a length greater than the length of each of said two adjacent filter plates (3), an upper surface, a lower surface and two side edges, said filter belt being slidably mounted between two adjacent filter plates (3) and capable of sliding in a direction of travel parallel to the length of said filter belt (1);
   a scraper (7) contacting and extending transversely and obliquely across at least a portion of the width of the upper surface of said filter belt (1), said portion being outside of said two adjacent filter plates (3), said scraper (7) having a V shape with two arms and being positioned on said filter belt (1) so that the vertex of said V shaped scraper (7) points toward said filter plates (3) and in a direction opposite to the direction of travel of said filter belt (1), the two arms of said V shaped scraper extending to the side edges of said filter belt (1); and
   an abutment (8) contacting a portion of the lower surface of said filter belt (1) substantially beneath the portion of the upper surface of said filter belt (1) contacting said scraper (7).

2. The multi-deck filter of claim 1, wherein said scraper (7) has a flexurally rigid profile that extends over the entire width of said filter belt (1).

3. The multi-deck filter of claim 2, wherein said abutment (8) urges said filter belt (1) against said scraper (7).

4. The multi-deck filter of claim 2, further comprising a plurality of scrapers (7, 11) substantially parallel to one another, said plurality of scrapers (7, 11) being partially one in front of the other across the width of said filter belt (1) in the direction of travel of said filter belt (1).

5. The multi-deck filter of claim 1, wherein said abutment (8) urges said filter belt (1) against said scraper (7).

6. The multi-deck filter of claim 1, further comprising a plurality of scrapers (7, 11) substantially parallel to one another, said plurality of scrapers (7, 11) being partially one in front of the other across the width of said filter belt (1) in the direction of travel of said filter belt.

7. The multi-deck filter of claim 1, wherein said abutment (8) has a rounded profile, is positioned transversely and obliquely across the width of said filter belt (1), and is positioned between said scraper (7) and said filter plates (3), and wherein said scraper is positioned so as to distend said filter belt (1) downward to urge said filter belt (1) against said abutment (8).

* * * * *